: 3,822,254
Patented July 2, 1974

3,822,254
SYNTHESIS OF 25-HYDROXYCHOLESTEROL
John Joseph Partridge, Jr., and Milan Radoje Uskokovic, Upper Montclair, N.J., assignors to Hoffmann-La Roche Inc., Nutley, N.J.
No Drawing. Filed May 21, 1973, Ser. No. 362,569
Int. Cl. C07c 173/00
U.S. Cl. 260—239.55 R       40 Claims

ABSTRACT OF THE DISCLOSURE

25-Hydroxycholesterol, an intermediate in the preparation of biologically important metabolites of Vitamin $D_3$ is synthesized in a multi-step process from stigmasterol.

BRIEF DESCRIPTION OF THE INVENTION

It has recently been discovered that a metabolite of Vitamin $D_3$, 25-hydroxycholecalciferol is a significantly better anti-rachitic agent than Vitamin $D_3$ itself. This compound had been prepared from 25-hydroxycholesterol-3-acetate which in turn was prepared from 3β-hydroxy-5-cholenic acid. Since the latter compound is no longer a readily available starting material for the preparation of 25-hydroxycholesterol and its esters, it would be desirable to find a route to 25-hydroxycholesterol utilizing an inexpensive and readily available starting material.

The present invention relates to a novel process for the preparation of 25-hydroxycholesterol and its esters starting from the naturally occurring (readily available and inexpensive) starting material, stigmasterol, which is isolated commercially from soybeans.

The synthesis involves, as key steps, the protection of the 3-hydroxy-$\Delta^5$-function by formation of an i-steroid, cleavage of the 22,23-double bond, and introduction of the properly substituted 5-carbon fragment to afford the 25-hydroxycholesterol side chain.

As used throughout the specification and the appended claims, the term "alkyl group" refers to a monovalent substitutent consisting solely of carbon and hydrogen of from 1 to 20 carbon atoms which may be straight or branched-chain. Examples of alkyl groups are methyl, ethyl, n-propyl, i-propyl, tert-butyl, hexyl, octyl, and so forth. The term "alkylene group" refers to a divalent substituent consisting solely of carbon and hydrogen of from 1 to 20 carbon atoms which may be straight or branched chain and whose free valences are attached to two distinct groups. Examples of alkylene groups are methylene, ethylene, propylene and so forth. The term "alkoxy group" refers to a monovalent substituent which consists of an alkyl group linked through an ether oxygen having its free valence bond from the ether oxygen. Examples of alkoxy groups are methoxy, ethoxy, isopropoxy, tert-butoxy, and so forth. The term "phenyl alkoxy" refers to an alkoxy group which is substituted by a phenyl ring. Examples of phenyl alkoxy groups are benzyloxy, 2-phenylethoxy, 4-phenylbutoxy, and so forth. The term "alkanoyloxy group" refers to the residue of an alkylcarboxylic acid formed by removal of the hydrogen from the hydroxyl portion of the carboxyl group. Examples of alkanoyloxy groups are formyloxy, acetoxy, butyryloxy, hexanoyloxy, and so forth. The term "substituted," as applied to "phenyl," refers to phenyl which is substituted with one or more of the following groups: alkyl, halogen (i.e., fluorine, chlorine, bromine or iodine), nitro, cyano, trifluoromethyl, and so forth. The term "lower," as applied to any of the aforementioned groups, refers to those groups having from 1 to 8 carbon atoms.

In the formulae presented herein, the various substituents are illustrated as joined to the steroid nucleus by one of threee notations: a solid line (——) indicating a substituent which is in the β-orientation (i.e., above the plane of the molecule), a dotted line (-------) indicating a substituent which is in the α-orientation (i.e., below the plane of the molecule), or a waxy line (∿∿∿) indicating a substituent which may be in the α- or β-orientation. The formulae have all been drawn to show the compounds in their absolute stereochemical configuration. Inasmuch as both the starting material, stigmasterol, and the final product, 25-hydroxycholesterol, are naturally occurring materials, they exist in the single absolute configuration depicted herein. However, the process of the present invention is intended to apply as well to the synthesis of steroids of the "unnatural" and racemic series, i.e., the enantiomers of the compounds depicted herein and mixtures of both.

The first step of the synthetic sequence involves the protection of the 3-hydroxy-$\Delta^5$-system by the conversion of stigmasterol (I)

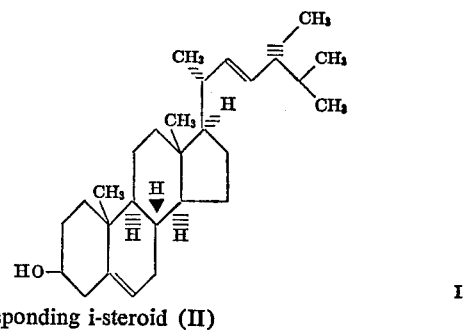

I to a corresponding i-steroid (II)

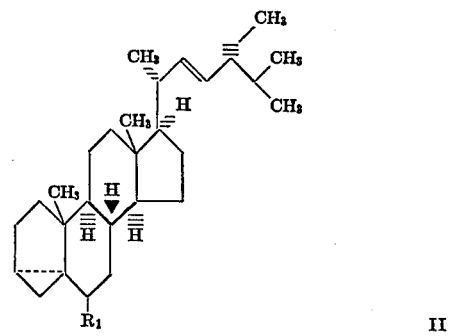

II wherein $R_1$ is hydroxy, lower alkoxy, phenyl lower alkoxy, lower alkanoyloxy or benzoyloxy.

This transformation is conveniently made by first converting stigmasterol to a 3β-sulfonyloxy derivative of formula III

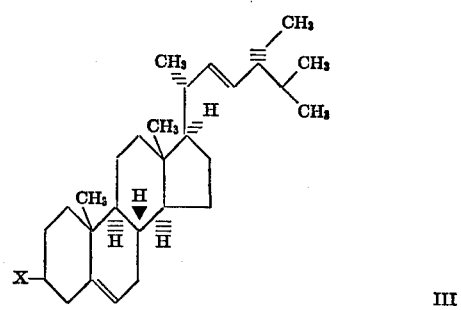

III wherein X is lower alkylsulfonyloxy, phenylsulfonyloxy or substituted phenylsulfonyloxy, such as a tosylate or mesylate, by methods known per se, such as reaction of stigmasterol with the corresponding sulfonyl halide in the presence of an organic base such as pyridine. This derivative is subsequently converted to the i-steroid by treatment with base in an appropriate solvent, again by methods well known in the steroid art.

For example, to prepare i-stigmasteryl-6-methyl ether (that is, formula II wherein $R_1$ is methoxy), one would employ methanol as a solvent. As suitable bases, there may be mentioned organic amine bases such as pyridine or triethylamine. If one wished to prepare i-stigmasterol (that is, formula II, wherein $R_1$ is hydroxy), one would use an aqueous medium. To prepare a 6-ester, for example, a 6-acetate, one would use an alkanoic acid such as acetic acid as a solvent. Suitable bases in this case would include alkali metal salts of the acid employed, e.g., sodium acetate.

Compounds of formula II are converted to the 22-alcohol of formula IV

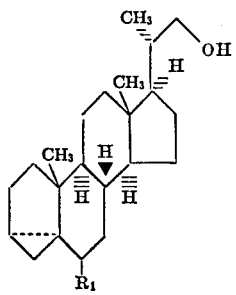

IV where $R_1$ is as above, by a procedure involving ozonolysis of the 22,23-double bond, followed by reduction of the ozonide thus formed.

The first part of this reaction sequence is conducted by treating the compound of formula II with ozone. The ozone is conveniently introduced in a stream of oxygen and may be prepared by one of the many commercially available ozonizers. The content of ozone in the stream can be determined by standard analytical techniques. One would ordinarily use equivalent amounts of ozone to the steroid being ozonized, but it is preferred to utilize a slight excess of ozone, for example, about a 10 to 30% excess, to ensure complete ozonolysis of the hindered 22,23-double bond of the compound of formula II. The ozonolysis is suitably conducted in an organic solvent which is inert to treatment with ozone. Suitable organic solvents for this purpose include halogenated aliphatic hydrocarbons such as dichloromethane, carbon tetrachloride, chloroform, and the like; and saturated aliphatic hydrocarbons such as pentane, hexane, heptane, and the like.

It is also preferred to have present in the ozonolysis medium a catalytic amount (e.g., 0.1 to 1.0 equivalents) of an organic amine base such as pyridine or triethylamine. The ozonolysis may be conducted over a temperature range of from about —78 to about +20° C. It is most convenient to carry out the ozonolysis reaction at a reduced temperature, for example, from about —40° to about —78° C.

The ozonide thus formed is reductively decomposed to afford the alcohol of formula IV. This reductive decomposition is effected by treatment of the ozonide with a complex metal hydride reducing agent. The type of complex metal hydride reducing agent which is employed in this reaction is the same as that normally utilized for the reduction of a carbonyl group to an alcohol group. Among the complex metal hydride reducing agents that may be mentioned are, for example, alkali metal borohydrides such as sodium borohydride and lithium borohydride; mono-, di- or tri-(lower alkoxy) alkali metal borohydrides such as, for example, sodium bis(ethoxy)borohydride; alkali metal aluminum hydrides such as lithium aluminum hydride and sodium aluminum hydride; mono-, di- or tri-(lower alkoxy) alkali metal aluminum hydrides such as, for example, lithium tris(tert-butoxy) aluminum hydride; mono-, di- or tri-(lower alkoxy lower alkoxy) alkali metal aluminum hydrides such as, for example, sodium bis(2-methoxyethoxy) aluminum hydride; aluminum hydride; di(lower alkyl) aluminum hydrides such as, for example, diisobutyl aluminum hydrides; and so forth.

It is most convenient to utilize a complex metal hydride which is relatively soluble in an inert organic solvent and which may be added in solution to react with the ozonide. A particularly convenient complex metal hydride for this purpose is sodium bis(2-methoxyethoxy) aluminum hydride which is commercially available as a solution in benzene. Generally, it is desired to utilize at least one equivalent of the complex metal hydride reducing agent with respect to the ozonide. However, it is usually preferred to utilize an excess of the metal hydride reducing agent, for example, about a molar excess.

The reductive decomposition of the ozonide is conveniently carried out at a temperature between about —78° C. and about room temperature. Most conveniently, the complex metal hydride reducing agent is added to a cold solution of the ozonide *in situ*. The reaction mixture can then be allowed to warm up to, for example, room temperature, if desired. However, the reaction can also effectively be carried out by adding the complex metal hydride reducing agent to the ozonide at a more elevated temperature, for example, about 0° to about room temperature.

During the reductive decomposition, an alkanoyloxy or benzoyloxy group ($R_1$) in the 6-position may be partially reduced to the corresponding alcohol. The alcohol may be carried through the remainder of the reaction sequence as is, or it may be reacylated in the usual manner at a later stage after the 22-alcohol function has been removed.

The alcohol of formula IV is subsequently converted in the next reaction step to the halide or sulfonate ester of formula V

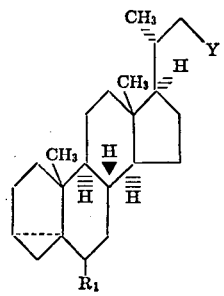

V wherein Y is bromo, iodo, lower alkylsulfonyloxy, phenylsulfonyloxy or substituted phenylsulfonyloxy, and $R_1$ is as above.

To prepare a compound of formula V wherein Y is a substituted sulfonyloxy group, one would react the compound of formula IV with the properly substituted sulfonyl halide according to methods known per se as mentioned above for the preparation of compound III. The preparation of compounds of formula V wherein Y is bromo or iodo can be accomplished either by direct conversion of the alcohol of formula IV to the desired halo group by means of a halogenating agent such as, for example, phosphorous tribromide, according to methods known per se, or by reaction of one of the sulfonate esters of formula V with a halide ion containing compound. For example, the compound of formula V wherein Y is tosyloxy may be reacted with an alkali metal bromide or iodide, for example, potassium bromide or potassium iodide to afford the compound of formula V wherein Y is bromo or iodo, respectively. All of these interconversions to prepare the compounds of formula V are standard in the art for the preparation of primary alkyl halides and sulfonate esters from primary alcohols.

In the next step, the compound of formula V is reacted with a metalated acetylene derivative of formula VI $$M-C\equiv C-\underset{\underset{CH_3}{|}}{\overset{\overset{CH_3}{|}}{C}}-Z$$

V wherein M is sodium, potassium, lithium or magnesium/2 and Z is OM, or a group of the formula

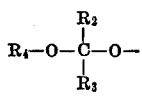

wherein $R_2$ is hydrogen or lower alkyl, $R_3$ and $R_4$ are each independently lower alkyl, and $R_3$ and $R_4$ taken together are lower alkylene of from 3 to 6 carbon atoms, to afford the steroid of formula VII

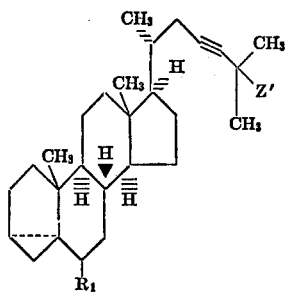

VII wherein $R_1$ is as above, and $Z'$ is hydroxy or a group of the formula

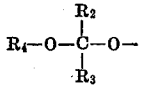

wherein $R_2$, $R_3$ and $R_4$ are as above, which contains all of the carbons of the cholesterol skeleton and which contains, in the 25-position, a protected hydroxy group.

The compound of formula VI is prepared from 3-methyl-1-butyn-3-ol. The first step, where Z is to be a group of the formula

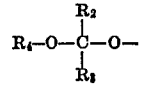

involves protection of the hydroxyl group as part of an acetal or ketal moiety, for example, by conversion to a tetrahydrofuran-2-yl or tetrahydropyran-2-yl ether, or by conversion to, for example, a methoxy-methoxy group, or a 2-(2-methoxy)-isopropoxy group according to methods well known for the formation of such protective groups. The protected alcohol is then converted to its acetylenic metal derivative by reaction with the appropriate organometallic reagent. For example, the lithium salt may be formed by reaction of the free acetylene with, for example, n-butyl lithium. Formation of the magnesium derivative is effected by reaction of the free acetylene with a lower alkyl Grignard reagent such as, for example, methyl magnesium chloride, to afford the corresponding magnesium halide (Grignard) derivative which is in equilibrium with the diacetylenic magnesium derivative of formula VIa according to the equation $$2RMgX \rightleftarrows R_2Mg + MgX_2 \quad \text{(VIa)}$$

wherein R is

and Z is as above.

Where Z is to be OM, the hydroxy group of 3-methyl-1-butyn-3-ol is metalated concurrently with metalation of the acetylenic group.

As mentioned above, the metalated derivative of formula VI is reacted with the halide or sulfonate ester of formula V to afford the alkylated compound of formula VII. The aforementioned reaction may be carried out in aprotic inert organic solvent such as for example, ethers, e.g., diethylether, tetrahydrofuran, dioxane and so forth; amides, e.g., diethylformamide and hexamethylphosphoramide; dimethyl sulfoxide; and so forth. When utilizing one of the alkali metal derivatives of formula VI (i.e., wherein M is sodium, potassium or lithium) as a reactant there is often unavoidably present in the reaction mixture some alkali metal halide. For example, during the preparation of a lithium compound of formula VI, one would normally utilize a lithium alkyl such as n-butyl lithium. Commercial samples of n-butyl lithium contain substantial amounts of lithium chloride which is carried over into the subsequent alkylation reaction. It has been found that the presence of alkali metal halide, particularly the chloride or bromide, in the alkylation reaction can result in the displacement of the leaving group in the 22-position of compound V, yielding, for example, the compound of formula V having a 22-chloro group which does not readily react with the compound of formula VI.

In order to avoid the formation of such by-products of this sort, a preferred alkylation procedure employs a solvent medium which will substantially complex with alkali metal halides so as to take them out of circulation. Preferred solvents for this purpose are dioxane and dimethylsulfoxide. The use of a solvent such as dioxane is particularly preferred when one is dealing with the magnesium derivative of formula VIa since magnesium halide, which is also in equilibrium with the Grignard reagent, can be largely complexed and will not result in substantial formation of by-products.

The alkylation reaction between compound V and VI is conveniently carried out at an elevated temperature between about 40 and about 150° C. Most preferably, the alkylation reaction is conducted between a temperature of about 80 and 120° C. The desired alkylation product of formula VII can be isolated by usual chemical and physical means such as chromatography and recrystallization and in this manner can be separated from any undesired reaction products such as, for example, the 22-chloride derived from compound V, or possible coupling product arising from two molecules of acetylene of formula VI.

In the next reaction step, the acetylenic compound of formula VII is hydrogenated utilizing two moles of hydrogen to afford the saturated side chain compound of formula VIII

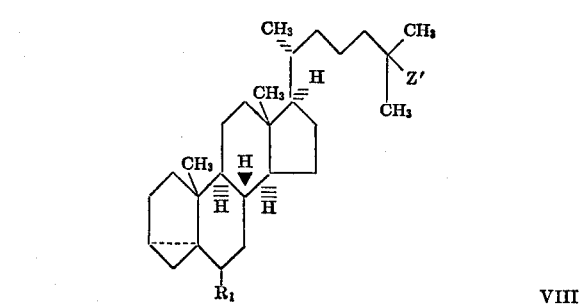

VIII wherein $R_1$ and $Z'$ are as above.

The hydrogenation reaction is conducted according to methods known per se for such reactions and is carried out in the presence of a metal hydrogenation catalyst commonly employed in the art; suitable metal catalysts are nickel and the noble metal catalysts such as platinum, palladium, rhodium, and so forth. The catalysts employed are normally utilized in a finely divided state and may be either unsupported or present on a suitable inert catalyst support. As catalyst supports which may be utilized for the present reaction, there can be mentioned, among others, charcoal, asbestos, diatomaceous earth, barium carbonate, calcium carbonate, strontium carbonate, alumina, and so forth.

The quantity of catalyst which may be employed is not narrowly critical and the amount of catalyst (including support) can vary from about 1 to about 50 weight percent, relative to the compound being hydrogenated. It is generally preferred to utilize between about 5 and about 15 weight percent of a catalyst. Furthermore, the metal catalyst may be present on a support in a range from about 2 to about 20 weight percent. A particularly preferred catalyst for the present purposes is palladium on a charcoal support.

As solvents for the hydrogenation reaction, there may be mentioned, among others, ethers, such as diethyl ether, tetrahydrofuran and dioxane; alcohols such as methanol or ethanol; esters such as ethyl acetate; and so forth. It is generally preferred, during the hydrogenation procedure, to have present in the reaction medium a small amount of base to prevent any cleavage of the 25-hydroxy protecting group or retro-i-rearrangement during the hydrogenation reaction caused by acid that might be generated, for example, from an impurity, or from the solvent. Suitable bases which may be used for this purpose include alkali metal bicarbonates such as sodium bicarbonate, and organic amines such as pyridine or triethylamine.

The conditions of temperature and pressure for the hydrogenation reaction are not narrowly critical. One conveniently carries out the hydrogenation reaction at about, or slightly above, atmospheric pressure, although the reaction could be carried out at a substantially higher pressure. The temperature may vary from about 0° C. to elevated temperatures of about 100°, depending upon the solvent medium and the pressure employed. For convenience, it is preferred to carry out the present hydrogenation reaction at about room temperature.

The hydrogenated compound of formula VIII can be converted to 25-hydroxycholesterol or a 3-lower alkanoyloxy derivative thereof, formula IX

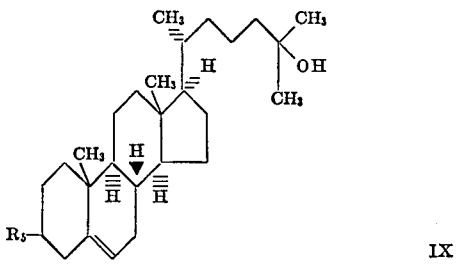

IX wherein $R_5$ is hydroxy or lower alkanoyloxy, by cleavage of the 25-protecting group (if present) and retro - i - rearrangement. This conversion can be accomplished either by a one-step reaction or (where Z' in compound VIII is other than hydroxy), by a two-step sequence. For example, 25 - hydroxychloesterol (IX, $R_5$=OH) can be directly prepared from a compound of formula VIII by treatment with a strong acid in an aqueous medium. Suitable strong acids for this purpose include mineral acids such as hydrochloric acid or sulfuric acid; and organic sulfonic acids such as p-toluenesulfonic acid. The aqueous medium may contain a miscible co-solvent to help solubilize the organic reactants, for example, an ether such as tetrahydrofuran or dioxane; or a ketone such as acetone. The one-step reaction which involves both cleavage of the protecting group for the 25-hydroxy function, where present, as well as the retro-i-rearrangement, occurs at a temperature between about 20 and 150° C. It is most preferable to carry out this rearrangement at a temperature between about 80 and about 120° C., most preferably at about the boiling point of the reaction medium. If one desires to prepare a 3-alkanoyloxy derivative of 25-hydroxycholesterol, that is, a compound of formula IX wherein $R_5$ is lower alkanoyloxy, the reaction is carried out in a medium containing the alkanoic acid corresponding to the alkanoyloxy group desired. Thus, for example, if one desires to prepare 25-hydroxycholesteryl 3-acetate, one would carry out the reaction in a solvent medium comprising acetic acid. For this reaction, no strong acid need be added since the alkanoic acid solvent itself will serve as the acidic source.

The temperature range for effecting this conversion is the same as for the preparation of 25-hydroxycholesterol itself, described above.

An alternative procedure for the preparation of compounds of formula IX, wherein Z' in the compound of formula VIII is other than hydroxy, involves a two-step conversion. In this sequence, the first reaction involves the hydrolysis of the 25-protecting group, without incurring a retro-i-rearrangement, to afford an intermediate compound of formula X

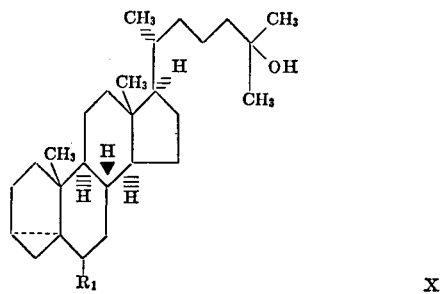

X wherein $R_1$ is as above.

It is indeed surprising that this two-step sequence can be employed since both the 25-protecting group and the i-steroid moiety are acid labile functions, and one would expect that, upon treatment with acid, to immediately lose both functions and go directly to 25-hydroxycholesterol or its ester without isolating the intermediate compound X.

This first step leading to compound X may be effected by treatment of the appropriate compound of formula VIII (wherein Z' is other than hydroxy) with a catalytic amount of a strong acid at a reduced temperature. As strong acids which are suitable for the above reaction, there may be mentioned mineral acids such as hydrochloric acid or sulfuric acid; and organic sulfonic acids such as p-toluenesulfonic acid. Suitable solvents for this reaction are hydroxylic solvents such as water and alcohols, e.g., methanol or ethanol, and mixtures of water or alcohols with inert organic solvents. The temperature at which this reaction may be carried out is from about −20 to about +20° C. An especially preferable temperature range is from about −10 to about +10° C., most preferably about 0° C.

The intermediate compounds of formula X tend to be highly crystalline and may be easily purified by recrystallization or chromatography, among other means, prior to their ultimate conversion to 25-hydroxycholesterol (or a 3-ester thereof). This latter rearrangement can be effected under the same conditions as described above for the direct conversion of compound VIII to compound IX, depending upon whether the product desired is 25-hydroxycholesterol itself or an ester thereof. The preferred reaction sequence to prepare 25-hydroxycholesterol and its esters starting from a compound of formula VIII wherein Z' is other than hydroxy involves the above-mentioned two-step procedure proceeding through compounds of formula X, since these intermediates can easily be purified and allow for the preparation of the final products in higher purity.

An alternate route to compounds of formula X begins with the 22-bromides or iodides of formula V. The first step of such sequence involves the treatment of said bromide or iodide with an organometallic complex of 1,1-dimethyl allyl of the formula

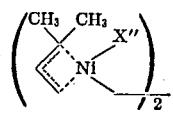

wherein X'' is chloro or bromo.

The product of such reaction is a steroid of formula XI

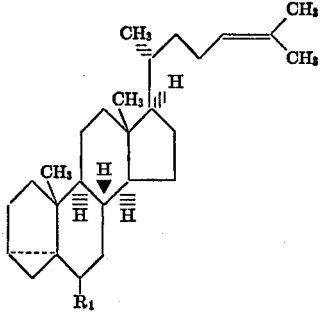

XI wherein $R_1$ is as above, having a double bond in the 24,25-position. A preferred organometallic complex of 1,1-dimethylallyl is π-(1,1-dimethylallyl) nickel bromide.

The reaction may be carried out over a temperature range of from about 0 to about 100° C., most preferably at a slightly elevated temperature, between about 40 and about 80° C. The reaction may be carried out in any inert organic solvent, most preferably an aprotic organic solvent such as dimethylformamide, dimethylsulfoxide, hexamethylphosphoramide, and so forth. Dimethylformamide is particularly preferred.

In the next step of this reaction sequence, the compound of formula XI is epoxidized with a peracid to afford the 24,25-oxido compound of formula XII

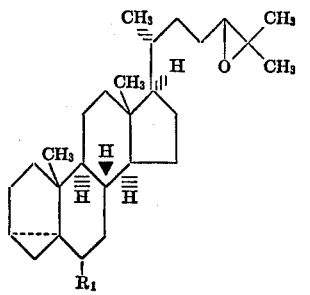

XII wherein $R_1$ is as above.

Suitable epoxidizing agents include perbenzoic acid; substituted perbenzoic acids such as m-chloroperbenzoic acid; peralkanoic acids such as performic acid and peracetic acid; trifluoroperacetic acid, and so forth. A particularly preferred peracid for this purpose is m-chloroperbenzoic acid. It is also preferred to utilize an equivalent amount of an inorganic base such as an alkali metal bicarbonate or carbonate to control the acidity of the reaction mixture and prevent reto-i-rearrangement. Suitable solvents for the epoxidation reaction include halogenated hydrocarbons such as methylene chloride, chloroform, carbon tetrachloride, and so forth.

In the next step, the epoxide of formula XII is converted to the 25-hydroxy-i-steroid of formula X by reduction of the epoxide with a complex metal hydride reducing agent. Suitable complex metal hydride reducing agents for this purpose include alkali metal aluminum hydrides such as lithium aluminum hydride; mono-, di- or tri-(lower alkoxy) alkali metal aluminum hydrides such as, for example, lithium tris(tert butoxy) aluminum hydride; mono-, di- or tri(lower alkoxy lower alkoxy) alkali metal aluminum hydrides such as, for example, sodium bis(2-methoxyethoxy) aluminum hydride; di(lower alkyl) aluminum hydrides such as, for example, diisobutyl aluminum hydride; and so forth. A particularly preferred complex metal reducing agent for this purpose is lithium aluminum hydride. Suitable solvents for the reductive cleavage include ethers such as diethyl ether, tetrahydrofuran and dioxane. The cleavage reaction is conveniently carried out at a temperature between about room temperature and about 100° C., most preferably between about 40 and 80° C.

The manifold process aspects and novel intermediates of the present invention are more fully illustrated in the following specific examples:

EXAMPLE 1

Stigmasteryl tosylate

To a solution of 200.0 g. (0.485 mole) of stigmasterol in 1600 ml. of dry pyridine was added 231.0 g. (1.21 mole) of p-toluenesulfonyl chloride and the mixture was stirred at 25° for 16 hrs. The solution was slowly poured into 10% potassium bicarbonate solution. The precipitated product was collected by filtration, washed with water and dried in vacuo overnight to yield 272.0 g. of stigmasteryl tosylate, m.p. 141–145°.

An analytical sample was prepared by two recrystallizations from acetone to yield pure tosylate; m.p. 148–149°; $[\alpha]_D^{25}$ —48.98°.

Analysis.—Calcd. for $C_{36}H_{54}O_3S$ (MW 566.90): C, 76.28; H, 9.60; S, 5.66. Found: C, 76.18; H, 9.72; S, 5.48.

EXAMPLE 2 i-Stigmasteryl methyl ether

A mixture of 160.0 g. (0.282 mole) of stigmasteryl tosylate 1600 ml. of methanol and 67 g. (0.846 mole) of pyridine was stirred at 75° for 3 hrs. The cooled solution was concentrated under reduced pressure. The residue was poured into water and extracted with ethyl acetate. The ethyl acetate solution was washed well with 1 N sulfuric acid, saturated aqueous sodium bicarbonate solution and saturated brine. The solution was dried over anhydrous magnesium sulfate and evaporated to dryness to yield 130.0 g. of colorless semisolid.

Crude stigmasteryl methyl ether was isolated by crystallization of the mixture from acetone-hexane. The mother liquors contained 90.0 g. of practically pure i-stigmasteryl methyl ether. A small sample was recrystallized from acetone at 0° to yield colorless cubes: m.p. 52–53°:

Analysis.—Calcd. for $C_{30}H_{50}O$ (MW 426.73): C, 84.43; H, 11.81. Found: C, 84.16; H, 12.04.

EXAMPLE 3

(20S)-20-hydroxymethyl-6β-methoxy-3α,5-cyclo-5α-pregnane

A solution of 20.0 g. (0.047 mole) of i-stigmasteryl methyl ether in 400 ml. of methylene chloride and 4 ml. of pyridine was cooled to −78° and treated with (0.056 mole) (20% excess) of ozonized oxygen. The reaction vessel was flushed with nitrogen and 27.20 g. (0.094 mole) of a 70% benzene solution of sodium bis(2-methoxyethoxy)-aluminum hydride was added. The mixture was stirred at −78° for 1 hr. then allowed to warm to 0° over a 1 hr. period and 2 N sulfuric acid was added to decompose the excess hydride. The mixture was poured into water and the product was extracted with methylene chloride. The methylene chloride solution was washed with 10% sulfuric acid and saturated aqueous sodium bicarbonate solution. The methylene chloride solution was then dried over anhydrous magnesium sulfate and evaporated to dryness. The 18.5 g. of crude reaction mixture was purified by column chromatography on Florisil pretreated with 1% pyridine in benzene. The 5% ether-benzene fractions afforded 10.50 g. of (20S)-20-hydroxymethyl - 6β - methoxy-3α,5-cyclo-5α-pregnane: glass; m.p. 80–83°; $[\alpha]_D^{25}$ +47.79° (c 0.96, CHCl₃); IR (CHCl₃) 3640, 1100, 1080 and 1020 cm.⁻¹; NMR (CDCl₃) δ 3.50 (m) 3.32 (s), 2.75 (t, J=1.5 Hz.), 1.01 (d, J=7 Hz.), 1.00 (s), and 0.73 (s); mass spectrum m/e 346 (M⁺).

EXAMPLE 4

(20S)-20-acetoxymethyl-6β-methoxy-3α-5-cyclo-5α-pregnane

A mixture of 1.00 g. (0.0029 mole) of (20S)-20-hydroxymethyl-6β-methoxy-3α,5-cyclo-5α-pregnane, 0.60 g. (0.0058 mole) of 97% acetic anhydride and 10 ml. of anhydrous pyridine was stirred at 25° for 6 hrs. The mixture was stirred for 10 minutes with ice and extracted with ethyl acetate. The ethyl acetate solution was washed with 1 N sulfuric acid, saturated aqueous sodium bicarbonate solution and saturated brine. The ethyl acetate solution was dried over anhydrous magnesium sulfate and evaporated to dryness to yield 1.11 g. of colorless solid. Recrystallization from hexane afforded 0.98 g. of (20S) - 20 - acetoxymethyl - 6β-methoxy-3α-5-cyclo-5α-pregnane, m.p. 123–124°.

An analytical sample was obtained by an additional recrystallization from hexane: m.p. 124–125°; $[\alpha]_D^{25}$ +47.9° (c 1.19, $CHCl_3$); IR ($CHCl_3$) 1735, 1260, 1100 and 1080 cm.$^{-1}$; NMR ($CDCl_3$) δ 3.90 (m), 3.35 (s), 2.80 (t, J=1.5 Hz.), 2.05 (s), 1.02 (s), 1.00 (d, J=7 Hz.) and 0.74 (s); mass spectrum m/e 388 (M+).

Analysis.—Calcd. for $C_{25}H_{40}O_3$ (MW 388.60): C, 77.27; H, 10.38. Found: C, 77.44; H, 10.23.

EXAMPLE 5

(20S)-6β-methoxy-20-(p-toluenesulfonoxymethyl)-3α,5-cyclo-5α-pregnane

To a solution of 9.05 g. (0.026 mole) of (20S)-20-hydroxymethyl-6β-methoxy-3α,5-cyclo-5α-pregnane in 11 ml. of pyridine was added dropwise 6.20 g. (0.033 mole) of p-toluenesulfonyl chloride in 9 ml. of pyridine at 0°. The mixture was stirred at 0° for 3 hrs. Several chips of ice were added and the mixture was stirred for 5 minutes to decompose the excess p-toluenesulfonyl chloride. The mixture was poured into water and the product was extracted with methylene chloride. The methylene chloride solution was washed with 1 N sulfuric acid, and saturated aqueous sodium bicarbonate solution. The solution was dried over anhydrous magnesium sulfate and evaporated to dryness to yield 13.0 g. of white solid. The material was crystallized from ethyl acetate to yield 12.0 g. (92%) of (20S)-6β-methoxy-20-(p-toluenesulfonoxymethyl)- 3α,5-cyclo-5α-pregnane, m.p. 142–144°.

An analytical sample was obtained by an additional crystallization: m.p. 144–145°; $[\alpha]_D^{25}$ +30.80° (c 1.00, $CHCl_3$); IR ($CHCl_3$) 1360, 1190, 1180, 1100 and 950 cm.$^{-1}$; NMR ($CDCl_3$) δ 7.50 ($A_2B_2$, $J_{AB}$=8 Hz., Δν=46 Hz., aromatic), 3.85 (m), 3.25 (s) 2.70 (t, J=1.5 Hz.), 2.38 (s), 0.95 (s), 0.93 (d, J=7 Hz.) and 0.62 (s); mass spectrum m/e 500 (M+).

Analysis.—Calcd. for $C_{30}H_{44}O_4S$ (MW 500.73): C, 71.95; H, 8.86; S, 6.40. Found: C, 71.74; H, 8.60; S, 6.66.

EXAMPLE 6

(20S)-20-iodomethyl-6β-methoxy-3α,5-cyclo-5α-pregnane

A mixture of 0.50 g. (0.0010 mole) of (20S)-6β-methoxy - 20 - (p - toluenesulfonoxymethyl)-3α,5-cyclo-5α-pregnane, 0.45 g. (0.0030 mole) of sodium iodide and 10 ml. of dry acetone was heated at reflux for 3 hrs. and cooled. The mixture was poured into water and extracted with ether. The ether extract was dried over anhydrous magnesium sulfate to yield 0.475 g. of pale yellow solid. The solid was recrystallized twice from pentane at 0° to yield 0.21 g. (46%) of (20S)-20-iodomethyl - 6β - methoxy-3α,5-cyclo-5α-pregnane, m.p. 103–104°; $[\alpha]_D^{25}$ +56.71° (c 1.09, $CHCl_3$); IR ($CHCl_3$) 1095, 1080 and 1020 cm.$^{-1}$; NMR ($CDCl_3$) δ 3.30 (s), 3.22 (m), 2.76 (t, J=1.5 Hz), 1.01 (d, J=7 Hz.), 1.01 (s) and 0.75 (s); mass spectrum m/e 456 (M+).

Analysis.—Calcd. for $C_{23}H_{37}IO$ (MW 456.45): C, 60.52; H, 8.17; I, 27.80. Found: C, 60.63; H, 8.15; I, 28.04.

EXAMPLE 7

3-methyl-1-butyn-3-ol tetrahydropyranyl ether

A mixture of 84.12 g. (1.00 mole) of 3-methyl-1-butyn-3-ol and 168.24 g. (2.00 mole) of 3,4-dihydro-2H-pyran was cooled to 0° and 0.05 g. (catalytic amount) of p-toluenesulfonic acid monohydrate was added. The mixture was stirred for 1 hr. at 0° and for 16 hrs. at 25°. The excess dihydropyran was removed under reduced pressure. The residue was poured into sodium bicarbonate solution and extracted with benzene. The benzene solution was washed with water and dried over anhydrous magnesium sulfate. The 184.0 g. of crude product was distilled to yield 119.5 g. (71%) of 3-methyl-1-butyn-3-ol tetrahydropyranyl ether: b.p. 30–33° (0.5 mm.); IR ($CHCl_3$) 3310, 1125, 1070, 1030, 1020, and 990 cm.$^{-1}$; NMR ($CDCl_3$) δ 5.06 (m), 2.44 (s), 1.51 (s) and 1.48 (s); mass spectrum m/e 168 (M+).

Analysis.—Calcd. for $C_{10}H_{16}O_2$ (MW 168.24): C, 71.39; H, 9.59. Found: C, 71.10; H, 9.49.

EXAMPLE 8

6β-methoxy-25-(2-tetrahydropyranyloxy)-3α-5-cyclo-5α-cholest-23-yne

A. From (20S)-6β-methoxy-20-(p - toluenesulfonoxymethyl)-3α,5-cyclo-5α-pregnane in dioxane solution: To a solution of 0.84 g. (0.0050 mole) of 3-methyl-1-butyn-3-ol tetrahydropyranyl ether in 25 ml. of distilled dioxane at 5° was added slowly 3.33 ml. of 1.5 M butyllithium in hexane and the mixture was stirred for 2 hrs. at ca. 5° and 2 hrs. at 25°. To this solution was added 1.25 g. (0.0025 mole) of (20S)-6β-methoxy-20-(p-toluenesulfonoxymethyl)-3α,5-cyclo-5α-pregnane and the mixture was heated at reflux for 72 hrs. The cooled solution was poured into water and the product was extracted with ethyl acetate. The ethyl acetate solution was washed with water and saturated brine and dried over anhydrous magnesium sulfate. The solution was evaporated to dryness and the crude reaction product was purified by column chromatography on silica gel using methylene chloride as the elutant to yield 1.14 g. (92%) of 6β-methoxy-25-(2-tetrahydropyranyloxy)-3α,5-cyclo-5α-cholest-23-yne as an oil; $[\alpha]_D^{25}$ +43.9 (c, 1.09, $CHCl_3$); IR ($CHCl_3$) 1075 and 1030 cm.$^{-1}$; NMR ($CDCl_3$) δ 5.06 (m), 3.28 (s), 2.76 (t, J=1.5 Hz.), 1.48 (s), 1.44 (s), 1.03 (d, J=7 Hz.), 1.00 (s) and 0.76 (s); mass spectrum m/e 496 (M+).

Analysis.—Calcd. for $C_{33}H_{52}O_3$ (MW 496.78): C, 79.79; H, 10.55. Found: C, 79.89; H, 10.19.

B. From (20S)-6β-Methoxy-20-(p - toluenesulfonoxymethyl)-3α,5-cyclo-5α-pregnane in hexamethylphosphoramide solution: To a solution of 0.168 g. (0.0010 mole) of 3-methyl-1-butyn-3-ol tetrahydropyranyl ether in 6 ml. of hexamethylphosphoramide was added 0.67 ml. of 1.5 M butyllithium in hexane at 0° and the mixture was stirred at 25° for 1 hr. A total of 0.10 g. (0.00020 mole) of (20S)-6β-methoxy-20-(p - toluenesulfonoxymethyl - 3α,5-cyclo-5 α-pregnane was added and the soluton was stirred at 25° for 48 hrs. The mixture was then poured into ammonium chloride solution and the product was extracted with benzene. The benzene solution was washed with water, dried over anhydrous magnesium sulfate, and evaporated to dryness. The 0.27 g. of isolated material was chromatographed on Merck PF–254 silica gel preparative TLC plates (20 x 20 x 0.2 cm.) with methylene chloride as the solvent to yield 0.065 g. of 6β-methoxy-25-(2-tetrahydropyranyloxy)-3α,5-cyclo-5α-cholest - 23 - yne: oil; NMR ($CDCl_3$) δ 5.06 (m), 3.28 (s), 2.76 (t, J=1.5 Hz.), 1.48 (s), 1.44 (s), 1.03 (d, J=7 Hz.), 1.00 (s) and 0.76 (s); mass spectrum m/e 496 (M+).

C. From (20S)-20-iodomethyl-6β-methoxy-3α,5-cyclo-5α-pregnane in hexamethylphosphoramide solution: To a solution of 0.084 g. (0.00050 mole) of 3-methyl-1-butyn-3-ol terahydropyranyl ether in 3 ml. of hexamethylphosphoramide was added 0.33 ml. of 1.5 M butyllithium in hexane at 0° and the mixture was stirred for 1 hr. at 25°. A total of 0.060 g. (0.00013 mole) of (20S)-20-iodomethyl-6β-methoxy-3α,5-cyclo-5α-pregnane was added and the mixture was stirred at 25° for 48 hrs. The mixture was poured into ammonium chloride solution and the product was extracted with benzene. The benzene solution was washed with water, dried over anhydrous magnesium sulfate, and evaporated to dryness. The crude product (0.13 g.) was chromatographed on Merck PF-254 silica gel preparative TLC plates (20 x 20 x 0.2 cm.) with methylene chloride as the solvent to yield 0.035 g. of 6β-methoxy-25-(2-tetrahydropyranyloxy)-3α,5-cyclo-5α-cholest-23 - yne: oil; NMR (CDCl$_3$) δ 5.06 (m), 3.28 (s), 2.76 (t, $J$=1.5 Hz.), 1.48 (s), 1.44 (s), 1.03 (d, $J$=7 Hz.); 1.00 (s), and 0.76 (s); mass spectrum $m/e$ 496 (M+).

EXAMPLE 9

6 β-methoxy-25-(2-tetrahydropyranyloxy)-3α,5-cyclo-5 α-cholestane

A mixture of 0.25 g. (0.00050 mole) of 6β-methoxy-25-(2-tetrahydropyranyloxy)-3α,5-cyclo-5α - cholest - 23-yne, 2 ml. of distilled dioxane, 0.1 g. of sodium bicarbonate and 0.025 g. of 10% palladium-on-carbon was stirred under 1 atmosphere of hydrogen until gas uptake ceased (24 hrs.). The mixture was diluted with ethyl acetate and filtered through Celite to remove the catalyst. Removal of solvent under reduced pressure yielded 0.25 g. of 6β-methoxy-25-(2-tetrahydropyranyloxy)-3α,5 - cyclo-5α-cholestane.

An analytical sample was purified by preparative TLC (5:1 benzene—ether) to yield pure tetrahydropyranyl ether: oil; [α]$_D^{25}$ +40.2° (c 1.04, CHCl$_3$); IR (CHCl$_3$) 1080 and 1030 cm.$^{-1}$; NMR (CDCl$_3$) δ 4.67 (m), 3.28 (s), 2.74 (t, $J$=1.5 Hz), 1.17 (s), 1.16 (s), 1.00 (s), 0.90 (d, $J$=7 Hz.) and 0.69 (s); mass spectrum $m/e$ 500 (M+).

Analysis.—Calcd. for C$_{33}$H$_{56}$O$_3$ (MW 500.81): C, 79.15; H, 11.27. Found: C, 79.03; H, 11.06.

EXAMPLE 10

25-hydroxy-6β-methoxy-3α,5-cyclo-5α-cholestane

A solution of 2.50 g. (0.0050 mole) of 6β-methoxy-25-(2-tetrahydropyranyloxy)-3α,5-cyclo-5α - cholestane and 60 ml. of methanol was cooled to 9° and 0.05 g. (catalytic amount) of p-toluenesulfonic acid monohydrate was added and the homogeneous solution was stirred at 0° for 2 hrs. During this time 25-hydroxy - 6β - methoxy - 3α,5-cyclo-5α-cholestane crystallized from solution as it formed. Solid potassium carbonate (0.5 g.) was added and the mixture was stirred for 15 minutes at 0°, then concentrated under reduced pressure. The residue was diluted with water and the product was extracted with ethyl acetate. The ethyl acetate solution was washed with water and saturated brine, dried over anhydrous magnesium sulfate and evaporated to dryness. The 2.20 g. of solid was recrystallized from hexane to yield 1.70 g. of crystalline alcohol m.p. 152–153°.

An analytical sample was prepared by an additional recrystallization from hexane to yield thick, colorless prisms: m.p. 153–154°; [α]$_D^{25}$ +48.16° (c 0.99, CHCl$_3$); IR (CHCl$_3$) 3620, 1095 and 1080 cm.$^{-1}$; NMR (CDCl$_3$) δ 3.28 (s), 2.73 (t, $J$=1.5 Hz.), 1.18 (s), 1.00 (s), 0.90 (d, $J$=7 Hz.) and 0.69 (s); mass spectrum $m/e$ 416 (M+).

Analysis.—Calcd. for C$_{28}$H$_{48}$O$_2$ (MW 416.69): C, 80.71; H, 11.61. Found: C, 80.78; H, 11.91.

EXAMPLE 11

25-hydroxycholesterol

A. From 6β-methoxy-25-(2-tetrahydropyranyloxy)-3α,5-cyclo-5α-chlolestane: A solution of 5.0 g. (0.010 mole) of 6β-methoxy-25-(2-tetrahydroxypyranyloxy)-3α,5-cyclo-5α-cholestane, 50 ml. of dioxane, 50 ml. of water and 0.25 g. (catalytic amount) of p-toluenesulfonic acid monohydrate was stirred at 80 for 4 hrs. and cooled. The thick, white precipitate was collected by filtration, taken up in methylene chloride, and washed with sodium bicarbonate solution. The solution was dried over anhydrous magnesium sulfate. Removal of solvent yielded 3.80 g. of white amorphous powder. Recrystallization from methane afforded 3.1 g. of 25-hydroxychloesterol, m.p. 175–177°.

An analytical sample was prepared by an additional recrystallization from methanol to yield colorless needles: m.p. 178–180°; [α]$_D^{25}$ −39.0° (c 1.05, CHCl$_3$); IR (CHCl$_3$) 3620, 1050, 1020, 960, 930 and 910 cm.$^{-1}$; NMR (CDCl$_3$) δ 5.33 (m), 3.48 (m), 1.19 (s), 1.00 (s), 0.92 (d, $J$=7 Hz.) and 0.67 (s); mass spectrum $m/e$ 402 (M+).

Analysis.—Calcd. for C$_{27}$H$_{46}$O$_2$ (MW 402.66): C, 80.54; H, 11.52. Found: C, 80.72; H, 11.59.

B. From 25-hydroxy-6β-methoxy-3α,5-cyclo-5α-cholestane: A mixture of 0.208 g. (0.00050 mole) of 25-hydroxy-6β-methoxy-3α,5-cyclo-5α-cholestane 2 ml. of water, 6 ml. of dioxane, and 0.010 g. (catalytic amount) of p-toluenesulfonic acid monohydrate was stirred at 80° for 6 hrs. and cooled. The solid was filtered, dissolved in methylene chloride and washed with aqueous sodium bicarbonate solution. The solution was dried over anhydrous magnesium sulfate and evaporated to dryness. Recrystallization from methanol afforded 0.165 g. of 25-hydroxycholesterol: m.p. 175–177°; NMR (CDCl$_3$) δ 5.33 (m), 3.48 (m), 1.19 (s), 1.00 (s), 0.92 (d, $J$=7 Hz.), and 0.67 (s).

C. From 25-hydroxycholesteryl 3-acetate: To a solution of 2.00 g. (0.0045 mole) of 25-hydroxycholesteryl 3-acetate in 35 ml. of methanol was added 0.40 g. (0.010 mole) of sodium hydroxide in 5 ml. of methanol and the mixture was stirred at 50° for 3 hrs. The cooled solution was concentrated in vacuo. The residue was taken up in ethyl acetate, washed with water and dried over anhydrous magnesium sulfate. Removal of solvent yielded 2.0 g. of white solid. This material was recrystallized from methanol to yield 1.60 g. of 25-hydroxycholesterol: m.p. 175–177°; NMR (CDCl$_3$) δ 5.33 (m), 3.48 (m), 1.19 (s), 1.00 (s), 0.92 (d, $J$=7 Hz.) and 0.67 (s).

EXAMPLE 12

25-hydroxycholesteryl 3-acetate

A. From 25-hydroxy-6β-methoxy-3α,5-cyclo-5α-cholestane: A solution of 10.0 g. (0.024 mole) of 25-hydroxy-6β-methoxy-3α,5-cyclo-5α-cholestane and 100 ml. of glacial acetic acid was stirred at 70° for 24 hrs. The cooled solution was concentrated under reduced pressure and the residue was poured onto crushed ice. The solution was neutralized with 2 N sodium hydroxide solution and the product was isolated with 1:1 methylene chloride—ethyl acetate. The solution was washed with water and saturated brine, dried over anhydrous magnesium sulfate and evaporated to dryness. The 11.0 g. of crude solid was recrystallized from acetone to yield 10.1 g. of 25-hydroxycholesteryl 3-acetate, m.p. 137–138°.

An analytical sample was prepared by an additional recrystallization to give colorless prisms: m.p. 139–140°; [α]$_D^{25}$ −41.4° (c 1.05, CHCl$_3$); IR (CHCl$_3$) 3620, 1725, 1265, and 1035 cm.$^{-1}$; NMR (CDCl$_3$) δ 5.36 (m), 4.55 (m), 2.01 (s), 1.20 (s), 1.00 (s), 0.92 (d, $J$=7 Hz.) and 0.67 (s); mass spectrum $m/e$ 384 (M+ −CH$_3$CO$_2$H).

Analysis.—Calcd. for C$_{29}$H$_{48}$O$_3$ (MW 444.70): C, 78.33; H, 10.88. Found: C, 78.48; H, 10.96.

B. From 6β-methoxy-25-(2-tetrahydropyranyloxy)-3α, 5-cyclo-5α-cholestane: A mixture of 0.080 g. (0.00016 mole) of 6β-methoxy-25-(2-tetrahydropyranyloxy)-3α,5-cyclo-5α-cholestane and 3 ml. of glacial acetic acid were stirred at 70° for 6 hrs. The mixture was poured into water and the product was isolated with ethyl acetate. The ethyl acetate solution was washed with saturated aqueous sodium bicarbonate solution and saturated brine, dried over anhydrous magnesium sulfate, and evaporated to dryness. The residue was recrystallized twice from acetone to yield 0.063 g. of 25-hydroxycholesteryl 3-acetate: m.p. 139–140°; NMR (CTCl₃) δ 5.36 (m), 4.55 (m), 2.01 (s), 1.20 (s), 1.00 (s), 0.92 (d, $J=7$ Hz.) and 0.67 (s).

C. From 25-hydroxycholesterol: To a solution of 0.201 g. (0.00050 mole) of 25-hydroxycholesterol in 4 ml. of pyridine was added dropwise 1.00 g. (0.00095 mole) of 97% acetic anhydride and the mixture was stirred for 16 hrs. at 25°. The mixture was briefly stirred with crushed ice and the product was isolated with ethyl acetate. The ethyl acetate solution was washed with 1 $N$ sulfuric acid, saturated aqueous sodium bicarbonate solution, and saturated brine. The ethyl acetate solution was dried over anhydrous magnesium sulfate and evaporated to dryness to yield 0.251 g. of white solid. Two recrystallizations from acetone afforded 0.184 g. of 25-hydroxycholesteryl 3-acetate: m.p. 139–140°: $[\alpha]_D^{25}$ —42.0° ($c$ 1.0, CHCl₃); IR (CHCl₃) 3620, 1725, 1265 and 1035 cm.⁻¹; NMR (CDCl₃) δ 5.36 (m), 4.55 (m), 2.01 (s), 1.20 (s), 1.00 (s), 0.92 (d, $J=7$ Hz.) and 0.67 (s); mass spectrum $m/e$ 384 (M⁺ —CH₃CO₂H).

EXAMPLE 13

6β-methoxy-3α,5-cyclo-5α-cholest-24-ene

A solution of 0.456 g. (0.00100 mole) of (20S)-20-iodomethyl-6β-methoxy-3α,5-cyclo-5α-pregnane in 2 ml. of dry dimethyl formamide was added to 0.261 g. (0.00063 mole) of π-(1,1-dimethylallyl)nickel bromide in 3 ml. of dimethylformamide and the mixture was stirred at 50–55° for 36 hrs.

The cooled reaction mixture was poured into pentane and this solution was washed with water and dried over anhydrous magnesium sulfate. Removal of solvent in vacuo afforded 0.40 g. of crude 6β-methoxy-3α,5-cyclo-5α-cholest-24-ene.

EXAMPLE 14

24,25-epoxy-6β-methoxy-3α,5-cyclo-5α-cholestane

A mixture of 0.358 g. (0.00090 mole) of 6β-methoxy-3α,5-cyclo-5α-cholest -24-ene, 3 ml. of methylene chloride and 0.20 g. of anhydrous sodium bicarbonate was cooled to 0° and 0.203 g. (0.0010 mole) of m-chloroperbenzoic acid (purity 85% by weight) in 3 ml. of methylene chloride was added dropwise. The mixture was stirred at 0° for 1 hr. and at room temperature for 16 hrs.

The mixture was diluted with water and the product was extracted with ethylene acetate. The ethyl acetate solution was washed with 10% aqueous sodium hydroxide solution, water, and brine. The solution was dried over anhydrous magnesium sulfate and evaporated to dryness to yield 0.370 g. of crude 24,25-epoxy-6β-methoxy-3α,5-cyclo-5α-cholestane.

EXAMPLE 15

25-hydroxy-6β-methoxy-3α,5-cyclo-5α-cholestane

To a solution of 0.302 g. (0.00073 mole) of 24,25-epoxy-6β-methoxy-3α,5-cyclo-5α-cholestane in 5 ml. of dry tetrahydrofuran was added 0.028 g. (0.00073 mole) of lithium aluminum hydride and the mixture was stirred at 60° for 2 hrs.

The mixture was cooled to 0° and diluted with 5 ml. of ether. To this solution was added 0.054 ml. of water followed by 0.043 ml. of 10% aqueous sodium hydroxide solution and the mixture was stirred at 0° for 1 hr. The solution was filtered and the filtrate was evaporated to dryness to yield 0.300 g. of a semisolid. Recrystallization from hexane gave 0.220 g. of 25-hydroxy-6β-methoxy-3α,5-cyclo-5α-cholestane, m.p. 152–153°; $[\alpha]_D^{25}$ +48.0°.

We claim:
1. A compound of the formula

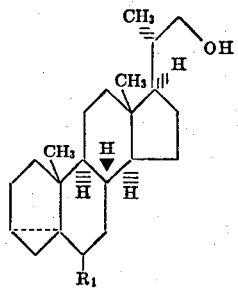

wherein $R_1$ is hydroxy, lower alkoxy, phenyl lower alkoxy, lower alkanoyloxy or benzoyloxy.

2. The compound of claim 1 which is (20S)-20-hydroxymethyl-6β-methoxy-3α,5-cyclo-5α-pregnane.

3. A compound of the formula

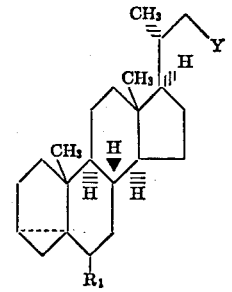

wherein $R_1$ is hydroxy, lower alkoxy, phenyl lower alkoxy, lower alkanoyloxy or benzoyloxy and Y is bromo, iodo, lower alkylsulfonyloxy, phenylsulfonyloxy or phenylsulfonyloxy substituted with one or more alkyl, halogen, nitro, cyano or trifluoromethyl groups.

4. The compound of claim 3 which is (20S)-6β-methoxy-20-(p-toluensulfonyloxymethyl) - 3α,5 - cyclo-5α-pregnane.

5. The compound of claim 3 which is (20S)-20-iodomethyl-6β-methoxy-3α,5-cyclo-5α-pregnane.

6. A compound of the formula

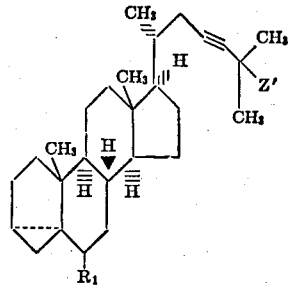

wherein $R_1$ is hydroxy, lower alkoxy, phenyl lower alkoxy, lower alkanoyloxy or benzoyloxy and Z' is hydroxy or a group of the formula

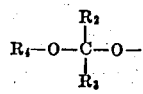

wherein $R_2$ is hydrogen or lower alkyl, $R_3$ and $R_4$ each taken independently are lower alkyl and $R_3$ and $R_4$ taken together are lower alkylene of from 3 to 6 carbon atoms.

7. The compound of claim 6 which is 6β-methoxy-25-(2-tetrahydropyranyloxy)-3α,5-cyclo-5α-cholest-23-yne.

8. A compound of the formula wherein $R_1$ is hydroxy, lower alkoxy, phenyl lower alkoxy, lower alkanoyloxy or benzoyloxy and $Z'$ is hydroxy or a group of the formula $$R_4-O-\underset{\underset{R_3}{|}}{\overset{\overset{R_2}{|}}{C}}-O-$$

wherein $R_2$ is hydrogen or lower alkyl, $R_3$ and $R_4$ each taken independently are lower alkyl and $R_3$ and $R_4$ taken together are lower alkylene of from 3 to 6 carbon atoms.

9. The compound of claim 8 which is 6β-methoxy-25-(2-tetrahydropyranyloxy)-3α,5-cyclo-5α-cholestane.

10. The compound of claim 8 wherein $Z'$ is hydroxy.

11. The compound of claim 10 which is 25-hydroxy-6β-methoxy-3α,5-cyclo-5α-cholestane.

12. A compound of the formula wherein $R_1$ is hydroxy, lower alkoxy, phenyl lower alkoxy, lower alkanoyloxy or benzoyloxy.

13. The compound of claim 12 which is 24,25-epoxy-6β-methoxy-3α,5-cyclo-5α-cholestane.

14. A process for the preparation of a compound of the formula wherein $R_1$ is hydroxy, lower alkoxy, phenyl lower alkoxy, lower alkanoyloxy or benzoyloxy, which comprises (a) treating a compound of the formula wherein $R_1$ is as above, with ozone in an inert organic solvent to afford an ozonide, and (b) contacting said ozonide with a complex metal hydride reducing agent.

15. The process of claim 14 wherein step (a) is conducted at a temperature between about −40 and −78° C.

16. The process of claim 14 wherein said complex metal hydride reducing agent is added to said ozonide at a temperature between about −40 and −78° C. and the mixture thus formed is allowed to warm up to between about 0 and +20° C.

17. The process of claim 14 wherein the complex metal hydride reducing agent is sodium bis(2-methoxyethoxy)aluminum hydride.

18. The process of claim 14 wherein an excess of complex metal hydride reducing agent is employed, relative to the ozonide.

19. The process of claim 14 wherein the solvent medium in step (a) comprises a halogenated aliphatic hydrocarbon and an organic amine base.

20. A process for the preparation of a compound of the formula wherein $R_1$ is hydroxy, lower alkoxy, phenyl lower alkoxy, lower alkanoyloxy or benzoyloxy, and $Z'$ is hydroxy or a group of the formula $$R_4-O-\underset{\underset{R_3}{|}}{\overset{\overset{R_2}{|}}{C}}-O-$$

wherein $R_2$ is hydrogen or lower alkyl, $R_3$ and $R_4$ each taken independently are lower alkyl and $R_3$ and $R_4$ taken together are lower alkylene of from 3 to 6 carbon atoms, which comprises contacting a compound of the formula

19 wherein $R_1$ is as above, and Y is bromo, iodo, lower alkylsulfonyloxy, phenylsulfonyloxy or substituted phenylsulfonyloxy with a compound of the formula

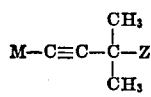

wherein M is sodium, potassium, lithium or magnesium/2 and Z is OM, or a group of the formula

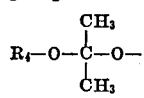

wherein $R_2$ is hydrogen or lower alkyl, $R_3$ and $R_4$ are each independently lower alkyl, and $R_3$ and $R_4$ taken together are lower alkylene of from 3 to 6 carbon atoms, in an aprotic inert organic solvent at an elevated temperature.

21. The process of claim 20 wherein Y is p-toluenesulfonyloxy.

22. The process of claim 20 wherein the temperature is between about 40 and 150° C.

23. The process of claim 22 wherein the temperature is between about 80 and 120° C.

24. The proces sof claim 20 wherein the aprotic inert organic solvent is a solvent which substantially complexes with alkali metal or magnesium halides.

25. The process of claim 24 wherein M is lithium and the solvent medium comprises dioxane or dimethylsulfoxide.

26. The process of claim 24 wherein M is magnesium/2 and the solvent medium comprises dioxane.

27. A process for the preparation of a compound of the formula

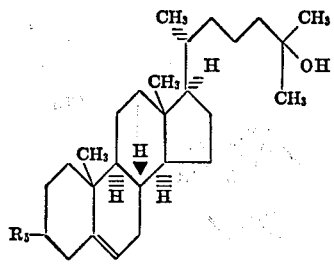

wherein $R_5$ is hydroxy or lower alkanoyloxy,
which comprises
(a) contacting a compound of the formula

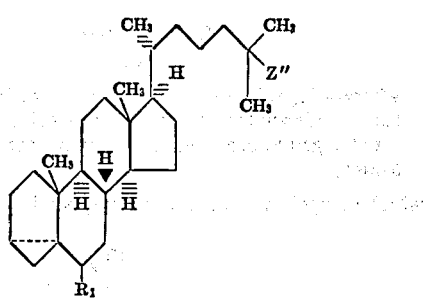

wherein $R_1$ is hydroxy, lower alkoxy, phenyl lower alkoxy, lower alkanoyloxy or benzoyloxy and Z" is a group of the formula

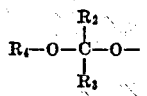

wherein $R_2$ is hydrogen or lower alkyl, $R_3$ and $R_4$ each taken independently are lower alkyl and $R_3$ and

20

$R_4$ taken together are lower alkylene of from 3 to 6 carbon atoms, with a catalytic amount of a strong acid at a reduced temperature in a hydroxylic solvent medium to afford a compound of the formula

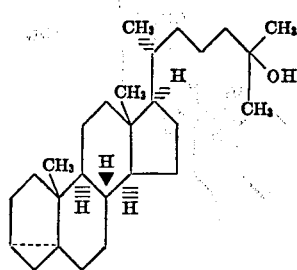

wherein $R_1$ is as above; and
(b) contacting said product from step (a) with a strong acid at a temperature between about 20 and 150° C. in a solvent medium comprising $R_5H$, wherein $R_5$ is as above.

28. The process of claim 27 wherein Z" is tetrahydropyranyloxy.

29. The process of claim 27 wherein, in step (a), the temperature is between about −10 and +10° C.

30. The process of claim 27 wherein, in step (b), the temperature is between about 80 and 120° C.

31. The process of claim 27 wherein, in step (a), the solvent medium comprises methanol or ethanol.

32. The process of claim 27 wherein, in step (b), the solvent medium comprises water.

33. The process of claim 27 wherein, in step (b), the solvent medium comprises acetic acid.

34. The process of claim 27 wherein the product of step (a) is purified prior to step (b).

35. A process for the preparation of a compound of the formula

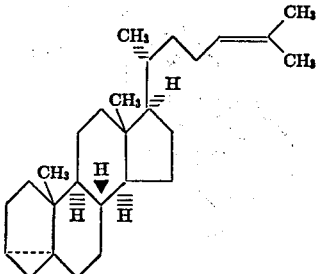

wherein $R_1$ is hydroxy, lower alkoxy, phenyl lower alkoxy, lower alkanoyloxy or benzoyloxy which comprises contacting a compound of the formula

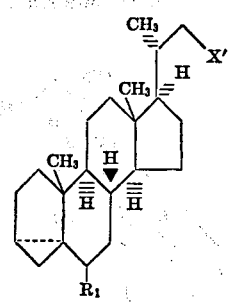

wherein $R_1$ is as above; and X' is bromo or iodo
with a compound of the formula

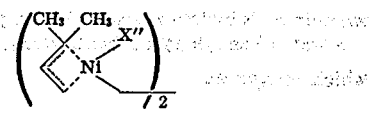

wherein X" is chloro or bromo in an inert organic solvent.

36. The process of claim 35 wherein X' is iodo.

37. The process of claim 35 wherein X" is bromo, i.e., π-(1,1-dimethylallyl)nickel bromide is employed.

38. The process of claim 35 wherein the temperature is between about 40 and 80° C.

39. The process of claim 35 wherein the solvent is an aprotic inert organic solvent.

40. The process of claim 39 wherein the solvent is dimethylformamide.

References Cited
UNITED STATES PATENTS
3,152,152   10/1964   Wechter _____ 260—397.2

HENRY A. FRENCH, Primary Examiner

U.S. Cl. X.R.
260—397.2, 397.5

UNITED STATES PATENT AND TRADEMARK OFFICE
CERTIFICATE OF CORRECTION

PATENT NO. : 3,822,254
DATED : July 2, 1974
INVENTOR(S) : John Joseph Partridge, Jr. and Milan Radoje Uskokovic It is certified that error appears in the above-identified patent and that said Letters Patent are hereby corrected as shown below:

Column 20, lines 71 to 73, claim 35,

" 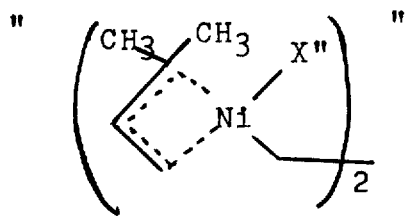 " should be

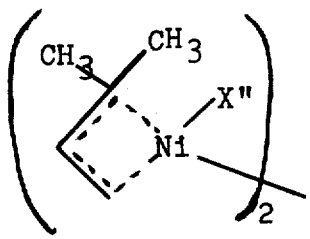 .

Signed and Sealed this

Thirteenth Day of July 1976

[SEAL]

Attest:

RUTH C. MASON
*Attesting Officer*

C. MARSHALL DANN
*Commissioner of Patents and Trademarks*